Dec. 9, 1969     H. TAX ET AL     3,482,720
VEHICLE FOR HANDLING LARGE CONTAINERS
Filed Dec. 21, 1967                         3 Sheets-Sheet 3
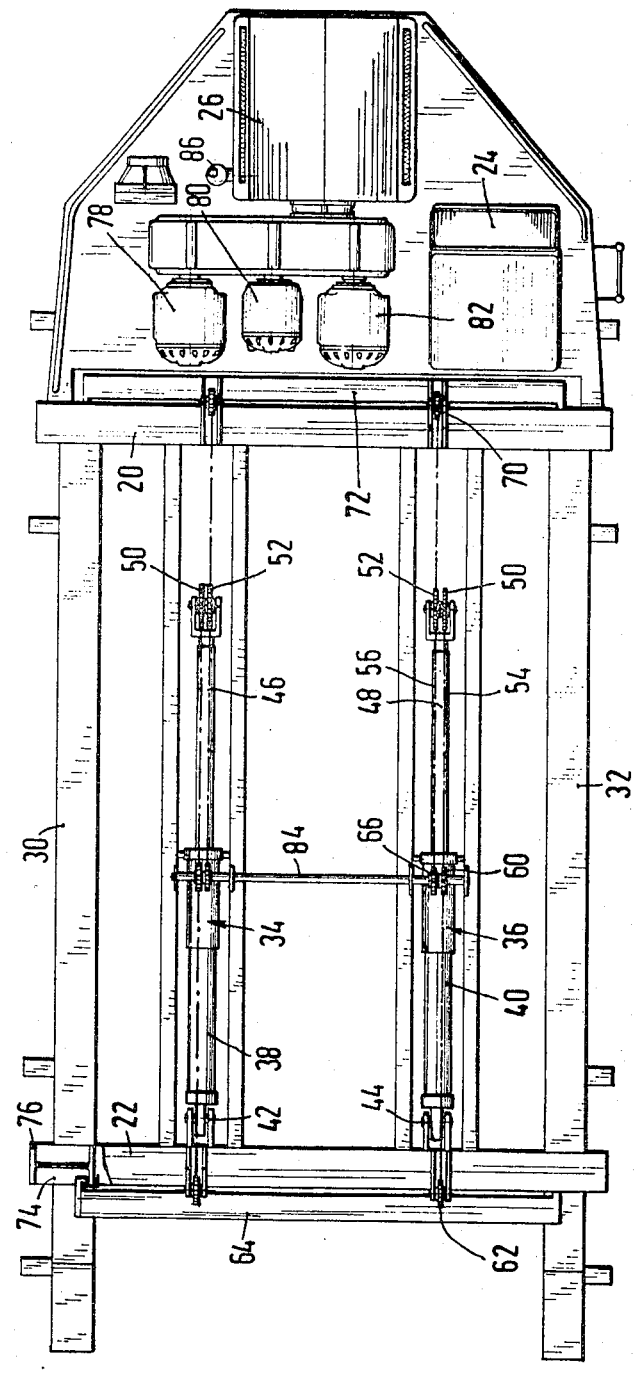
INVENTORS
HANS TAX
RÜDIGER FRANKE
By: Low and Berman
     Agents United States Patent Office 3,482,720
Patented Dec. 9, 1969

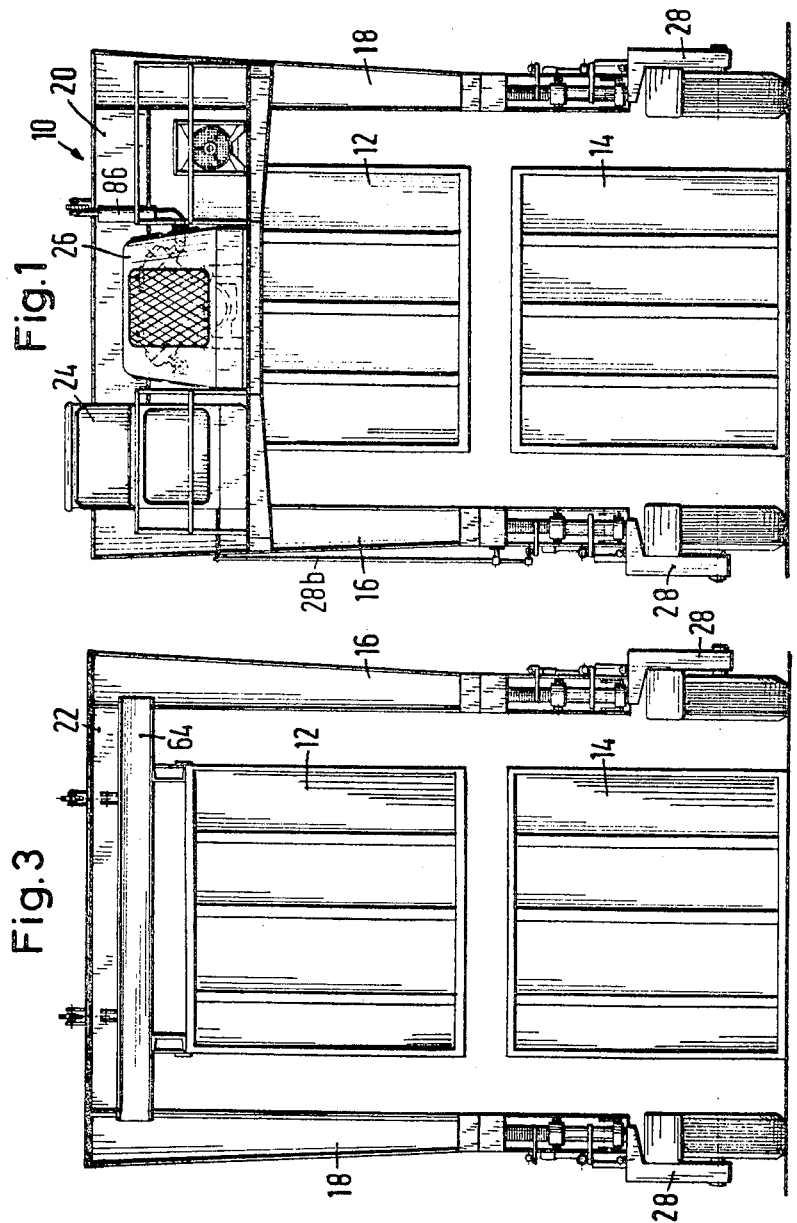

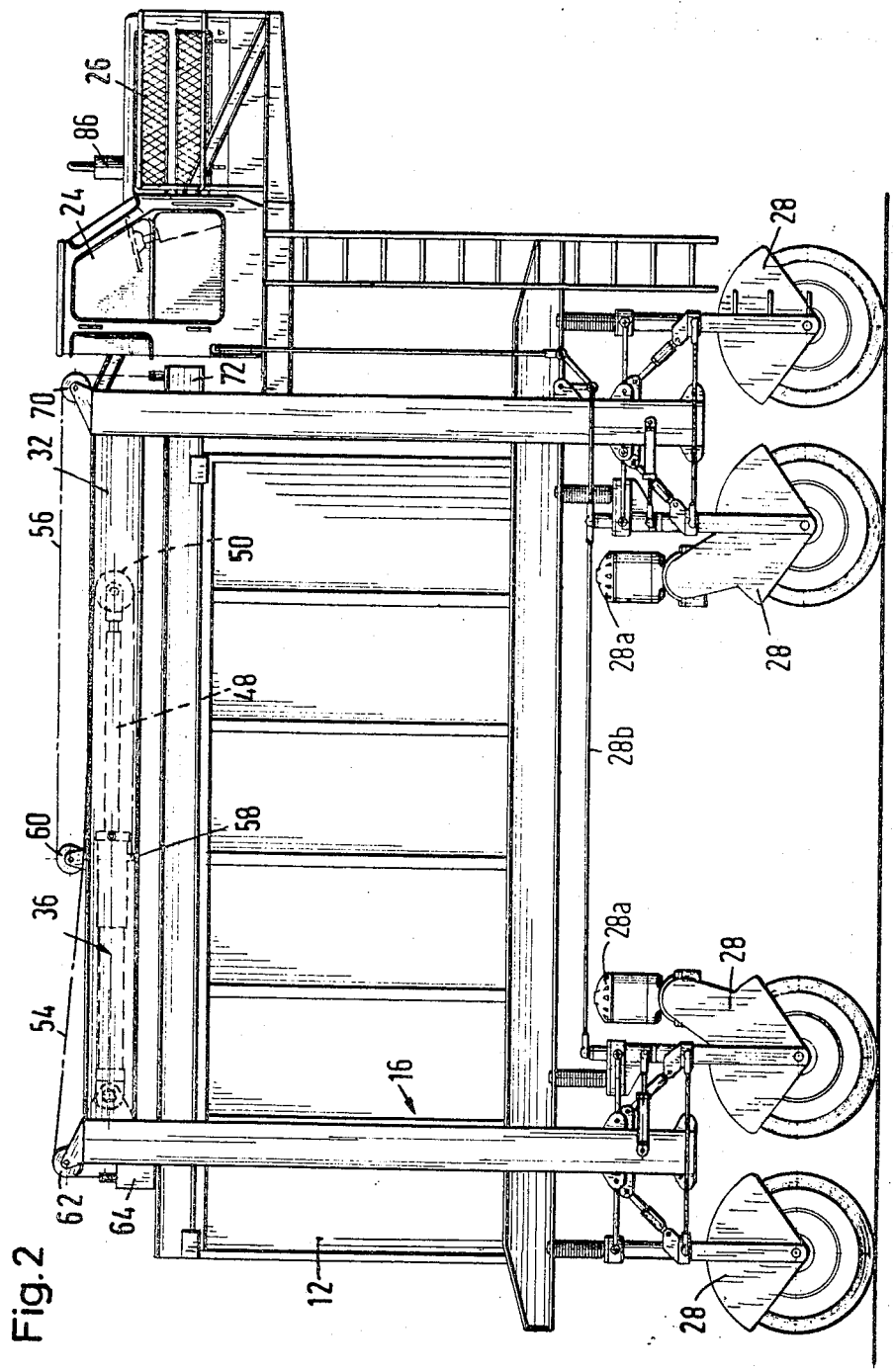

3,482,720
VEHICLE FOR HANDLING LARGE CONTAINERS
Hans Tax, 3 Potsdamerstrasse, 8 Munich 23, Germany, and Rudiger Franke, Munich, Germany; said Franke assignor to said Tax
Filed Dec. 21, 1967, Ser. No. 692,505
Int. Cl. B60p *3/00;* B66c *5/02*
U.S. Cl. 214—394      5 Claims

ABSTRACT OF THE DISCLOSURE

A vehicle for handling large containers for container ships whose supporting frame consists mainly of two open side walls and an open top wall fixedly connecting the side walls, the walls defining a tunnel lengthwise through the vehicle. An operator's cab and central power plant are mounted ahead of the tunnel near the top wall and approximately flush with the same. A lifting mechanism for a container suspended in the tunnel includes horizontally moving hydraulic jacks in the top wall structure and chains operated by the jacks and attached to the container.

BACKGROUND OF THE INVENTION

This invention relates to the handling of containers having the approximate dimensions of a truck trailer or of a railroad car, and particularly to a readily maneuverable vehicle for carrying such containers over short distances, for example, in a temporary storage area, and for stacking the containers.

Large containers of the type described are being used for transporting goods over land to a harbor, overseas on board of specially equipped ships, and again over land. Tractors and low bed trailers or special railroad cars are employed for overland transportation.

It is known to move the containers on piers or in other temporary storage areas by means of vehicles whose frames have two lateral upright portions elongated in the normal direction of vehicle movement and having transversely connected tops so that they define a downwardly open tunnel through the vehicle. Wheels at the bottoms of the lateral portions and a lifting mechanism for lifting and lowering a container received in the tunnel are operated from a central power plant by an operator, the plant and the operator's station being arranged on the supporting structure outside the tunnel.

In one known type of such vehicles the two lateral frame portions are equipped with upright hydraulic jacks at the four corners of the vhicle whose movable members are connected transversely of the normal forward direction of vehicle movement by rigid bars from which the container in the tunnel is suspended. This arrangement can cause severe transverse stresses in the jacks if a suspended container is loaded off center, and leakage of hydraulic fluid and other operating difficulties directly related to such stresses are common. They are aggravated by the fact that the jacks must have a stroke as great as the desired lifting height. Since it is desirable to stack containers on top of each other, the stroke of the jacks must be at least equal to the height of the tallest container to be handled.

It is an important object of this invention to provide an improved vehicle of the type described in which the hydraulic jacks employed for lifting a suspended container are stressed exclusively in the direction of the applied hydraulic pressure so that premature leakage through piston rings and cylinder packings is avoided, and wherein the stroke of the hydraulic jacks may be selected independently of the total required lifting height.

SUMMARY OF THE INVENTION

With these and other objects in view, as will hereinafter become apparent, the invention provides such a vehicle with a rigid supporting frame in which the tops of the two upright lateral portions of the vehicle are connected at a fixed height by transverse members spaced in the direction of vehicle movement. The spaced end portions of the transverse members are fixedly fastened to the lateral portions and constitute therewith an upper, horizontally extending portion of the supporting frame.

The hydraulic motor arrangement of the lifting mechanism includes a cylinder and a piston received in the cylinder for relative movement of the motor members in a horizontally extending direction substantially on the level of the upper support portion.

Other features, additional objects, and many of the attendant advantages of this invention will readily be appreciated from the following detailed description of a preferred embodiment when considered in connection with the appended drawing.

BRIEF DESCRIPTION OF THE DRAWING

In the drawing:
FIG. 1 shows a vehicle of the invention and shipping containers in front elevation;
FIG. 2 illustrates the vehicle of FIG. 1 and a container supported thereby in side elevation;
FIG. 3 is a rear-elevational view of the apparatus of FIG. 1; and
FIG. 4 shows the vehicle without its load in top plan view.

DESCRIPTION OF THE PREFERRED EMBODIMENT

Referring now to the drawing in detail, there is seen a vehicle having a frame 10 and carrying a large container 12 and having two lateral, skeleton walls 16, 18 connected at their tops by two transverse beams 20, 22 at the front and rear ends of the walls 16, 18 respectively. An operator's cab 24 and a diesel engine 26 are arranged high on the front of the vehicle in line with the tunnel which extends through the vehicle in the direction of normal, forward vehicle movement.

A pair of wheels 28 is mounted at each of the four corners of the vehicle at the bottoms of the lateral walls 16, 18. One wheel of each pair is equipped with a rotary hydraulic motor 28a, and the wheels may be steered by means of a linkage 28b connecting them with the operator's station in a manner not directly relevant to this invention.

As is best seen in FIG. 4, the top skeleton wall of the supporting structure is formed by the horizontal, longitudinal, top members 30, 32 of the side walls 16, 18, and by the transverse beams 20, 22. Two hydraulic jacks 34, 36, and more specifically, their cylinders 38, 40, are attached to the beam 22 by heavy pivots 42, 44 whose axes are parallel to the beam 22. The free front ends of the piston rods 46, 48 projecting from the jacks 34, 36 carry each a pair of toothed pulleys or sprockets 50, 52 which are fixedly and coaxially fastened to each other.

Link chains 54, 56 are respectively trained over the pulleys 50, 52, as will be described in more detail with reference to one of the chains 54. One end of the chain 54 is attached by a fastener 58 to the cylinder 40. The chain extends forward under the piston rod 48, in an arc of not significantly less than 180° over the pulley 50, under a sprocket 60 rotatably mounted on the cylinder 40, thence over an idler 62 or guide pulley 62 on the transverse beam 22, and downwardly at the rear end of the frame 10 to a verticaly moveable transverse carrier bar 64 whose right end, as viewed in the normal direction of vehicle movement, is secured to the free end of the chain 54. As is best seen in FIG. 2, the surfaces tangentially engaged by the chain 54 on the sprockets 50, 60, 62 are sufficiently misaligned transversely of the chain that the chain is held firmly in engagement with the teeth of the sprocket 60.

The left end of the carrier bar 64 is similarly secured to the free end of the chain 54 associated with the hydraulic jack 34 and trained over a system of sprockets analagous to that described above. The two ends of a carrier bar 72 at the front end of the frame 10 are attached to the free ends of the two link chains 56. They are also fastened to the cylinders 38, 40 respectively, trained in arcs of about 180° over sprockets 52 on the piston rods 46, 48, again in 180° arcs over idler sprockets 66 on the cylinders 38, 40, and ultimately over guide pulleys or sprockets 70 on the beam 20 from which they depend to the front carrier bar 72.

Guide channels 74, of which only one is seen in FIG. 4, guide the ends of the carrier bars in the four upright columns 76 of the frame 10 at the longitudinal ends of the lateral walls 16, 18. Relatively short hangers, not themselves seen in the drawing, suspend the container 12 from the carrier bars 64, 72 in a manner not new in itself.

The power plant arranged laterally adjacent the operator's cab includes three hydraulic pumps 78, 80, 82 connected to the diesel engine 26 by a transmission. The pump 78 is the common source of hydraulic fluid for the jacks 34, 36. The other two pumps supply fluid for the motors 28a.

The two sets of sprockets 60, 66 are fixedly mounted on a common shaft 84 which thus couples the four chains leading to the carrier bars 64, 72 and synchronizes their rates of movement in such a manner that a container if properly suspended from the carrier bars while supported on flat ground is lifted uniformly and is not subjected to torsional stresses while suspended from the supporting frame 10.

As is inherent in the block and tackle arrangement constituted by the pulleys or sprockets 50, 52, 60, 66, the distance over which the container is lifted or lowered by the jacks 34, 36 is twice the distance over which the piston rods 46, 48 and the associated, not illustrated pistons travel. Although the stroke of the jacks is relatively short, it is amply sufficient to lift the container 12 to the top of another container 14, as shown in FIGS. 1 and 3. The overall height of the vehicle is fixed, but it is only slightly greater than the maximum height to which a supported container can be lifted. The top wall of the frame 10 being approximately flush with the top of the cab 24 and the highest element of the diesel engine 26, an exhaust muffler 86, the vertical clearance required by the vehicle is relatively small.

The controls at the operator's station in the cab 24 have not been shown since they may be entirely conventional. They permit the rate and direction of fluid flow from the pumps 78, 80, 82 to the jacks 34, 36 and the motors 28a to be controlled, the controls interposed between the pump 78 and the jacks 34, 36 being coupled in an obvious manner, not shown, for operation of the lifting mechanism.

Various modifications will readily suggest themselves to those skilled in the art. The diesel engine 26 thus is merely one example of a prime mover suitable for the intended application. The four chains 54, 56 may be replaced by other tension members cooperating with pulleys suitably modified to impede or prevent relative circumferential movement of the pulleys and tension members. The carrier bars 64, 72 and the associated, non-illustrated hangers are merely representative of suitable means on the free ends of the tension members that may be employed for engaging a supported load such as the containers 12, 14. While a block arrangement which makes the stroke of the free ends twice the stroke of the hydraulic jacks, as illustrated and described, is adequate under most circumstances and preferred, obviously other ratios between the distances traveled by the piston rods 46, 48 and by the load 12 may be chosen if necessary.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention.

What is claimed is:

1. In a load carrying vehicle having a support including two lateral upright wall portions extending in the normal direction of vehicle movement and having transversely connected tops so as to define a downwardly open tunnel extending in said direction through the vehicle, a plurality of wheels at the bottoms of said lateral wall portions, a lifting mechanism on said support for lifting and lowering a load received in said tunnel, a prime mover and an operator's station on said support outside said tunnel and operatively connected to said wheels and to said lifting mechanism for operating the same under the operator's control, the improvement which comprises:
    (a) a plurality of transverse members having respective end portions fixedly fastened to said tops of said lateral wall portions and connecting the same at a fixed height,
        (1) said tops and said transverse members jointly constituting an upper, horizontally extending wall portion of said support;
    (b) hydraulic motor means in said lifting mechanism for lifting and lowering an attached load,
        (1) said motor means including a first cylinder member and a first piston member projecting from said cylinder member, one of said first members of the motor means being secured to said support for movement of the other first member in a horizontally extending direction substantially on the level of said upper wall portion,
        (2) said motor means further including a second cylinder member and a second piston member projecting from said second cylinder member, said cylinder members being secured to said support for movement of the respective piston members substantially in said normal direction of vehicle movement;
    (c) common pump means operatively connected to said prime mover and to said cylinder members for jointly supplying said cylinder members with hydraulic pressure fluid;
    (d) four tension members having respective first end portions secured to said support and respective second end portions;
    (e) a pair of pulley members rotatably mounted on each of said piston members for movement with the piston member substantially in said normal direction of vehicle movement,
        (1) portions of said tension members intermediate said end portions being trained over said pulley members respectively, whereby two tension members are associated with each piston member;
    (f) guide pulley means respectively guiding the second end portions of the two tension members associated with each piston member downward from portions of said upper wall portion spaced in said normal direction of vehicle movement; and
    (g) engaging means on said second end portions for engaging said load.

2. In a vehicle as set forth in claim 1, said prime mover and said operator's station being aligned with said tunnel in said normal direction of vehicle movement, at least one of said station and said prime mover being substantially flush with said upper wall portion.

3. In a vehicle as set forth in claim 1, said tension members being chains, and said pulley members having teeth engaging said chains.

4. In a vehicle as set forth in claim 1, said engaging means including a carrier member elongated transversely of said normal direction of vehicle movement, said free end portions being attached to respective end portions of said carrier member, and guide means on said support for guiding movement of said carrier member in a vertically extending direction.

5. In a vehicle as set forth in claim 1, coupling means connecting said four tension members for movement at the same rate when said piston members are moved relative to said cylinder members by the pressure of said fluid.

References Cited

UNITED STATES PATENTS

| | | | |
|---|---|---|---|
| 2,240,564 | 5/1941 | Le Tourneau | 214—394 |
| 2,902,183 | 9/1959 | Dodge | 214—392 |
| 2,982,430 | 5/1961 | Clifton | 214—392 |
| 3,146,903 | 9/1964 | Bjorklund | 214—394 |
| 3,348,712 | 10/1967 | Hanson | 214—396 |
| 2,772,010 | 11/1956 | Buehring | 214—394 |

ALBERT J. MAKAY, Primary Examiner

U.S. Cl. X.R.

212—14